United States Patent
Park et al.

(10) Patent No.: US 8,471,163 B2
(45) Date of Patent: Jun. 25, 2013

(54) AUTO TRANSFER SWITCH INCLUDING TERMINAL COVER

(75) Inventors: No-Chun Park, Seoul (KR); Choong-Hyun Lee, Seoul (KR)

(73) Assignee: Vitzrotech Co., Ltd., Gyeonggi-Do (KR)

( * ) Notice: Subject to any disclaimer, the term of this patent is extended or adjusted under 35 U.S.C. 154(b) by 302 days.

(21) Appl. No.: 12/771,734

(22) Filed: Apr. 30, 2010

(65) Prior Publication Data
US 2010/0276265 A1 Nov. 4, 2010

(30) Foreign Application Priority Data
May 4, 2009 (KR) .................. 20-2009-0005364 U

(51) Int. Cl.
*H01H 9/04* (2006.01)
(52) U.S. Cl.
USPC ...................... 200/333; 200/50.33; 200/293
(58) Field of Classification Search
USPC ............... 307/64; 335/202; 200/1 R, 17 R, 200/18, 50.32–50.4, 400, 401, 293, 333
See application file for complete search history.

(56) References Cited

U.S. PATENT DOCUMENTS

| 3,806,686 | A | * | 4/1974 | Gaskill ........................ 200/308 |
| 4,398,097 | A | * | 8/1983 | Schell et al. .................. 307/64 |
| 5,302,788 | A | * | 4/1994 | Link et al. .................... 200/401 |
| 6,307,456 | B1 | * | 10/2001 | Caggiano et al. ............ 335/202 |
| 6,538,223 | B1 | * | 3/2003 | Yoshida et al. .............. 200/401 |
| 6,576,851 | B1 | * | 6/2003 | Barlian et al. ............... 200/5 R |
| 6,815,622 | B2 | * | 11/2004 | Milman et al. ............... 200/5 R |
| 6,919,518 | B2 | * | 7/2005 | Rademacher et al. ........ 200/1 R |
| 7,009,126 | B2 | * | 3/2006 | Etscheidt et al. ............ 200/293 |
| 7,170,020 | B2 | * | 1/2007 | Kawata et al. ............... 200/333 |
| 7,402,766 | B1 | * | 7/2008 | Jonas et al. ................ 200/50.33 |

* cited by examiner

*Primary Examiner* — Michael Friedhofer
(74) *Attorney, Agent, or Firm* — Ohlandt, Greeley, Ruggiero & Perle, LLP

(57) ABSTRACT

Provided is a cover for protecting an upper end of a normal power terminal and an upper end of an emergency power terminal of an auto transfer switch. In this case, terminal covers are formed on the upper ends of the terminals to protect the terminals, thereby preventing operators from being hurt by electric shock.

1 Claim, 2 Drawing Sheets

AUTO TRANSFER SWITCH INCLUDING TERMINAL COVER

CROSS-REFERENCE TO RELATED PATENT APPLICATION

This application claims the benefit of Korean Utility Model Application No. 20-2009-0005364, filed on May 4, 2009, in the Korean Intellectual Property Office, the disclosure of which is incorporated herein in its entirety by reference.

BACKGROUND OF THE INVENTION

1. Field of the Invention

The present invention relates to a cover for protecting a normal power terminal and an emergency power terminal of an auto transfer switch, and more particularly, to a terminal cover for ensuring operators' safety and improving appearance of an auto transfer switch by forming the terminal cover having a 'ㄱ' shape or a '—' shape on an upper end of a normal power terminal and an upper end of an emergency power terminal.

2. Description of the Related Art

Generally, power supplied by Korea Electric Power Corporation is normal power, and power supplied by private power equipment of power consumers is emergency (reserve) power. In this case, auto transfer switches are devices for transferring the normal power to the emergency power, or vice versa.

Power is transferred by changing a power source provided to electric equipment. For example, when electricity fails while the normal power is supplied to the electric equipment, the power source is transferred by driving private power equipment, and thus the emergency (reserve) power can be supplied.

Referring to FIG. 1, a conventional auto transfer switch is configured in such a manner that terminals and an arc generator may be exposed out of the auto transfer switch.

With regard to the auto transfer switch, normal power is supplied to a normal power terminal 10, and emergency power is supplied to an emergency power terminal. Thus, movable contactors 13A and 13B operate in such a manner that current may be supplied to a load-side terminal 12. In the auto transfer switch, an upper end of the normal power terminal 10 and an upper end of the emergency power terminal 12 are exposed out of the auto transfer switch, without separate covers.

When terminals are exposed as described above, electric accidents are likely to occur, and appearance of the auto transfer switch may be ruined.

To overcome this problem, the present inventor suggests a method of ensuring operators' safety and improving the appearance by forming a terminal cover on an upper end of a terminal.

SUMMARY OF THE INVENTION

The present invention provides an auto transfer switch including a terminal cover for protecting a terminal and improving operators' safety.

According to an aspect of the present invention, there is provided an auto transfer switch that supplies normal power to a normal power terminal and supplies emergency power to an emergency power terminal to supply current to a load-side terminal, the auto transfer switch including a terminal covers formed on an upper end of the normal power terminal and an upper end of the emergency power terminal.

The terminal covers may each be formed to have a 'ㄱ(r)' shape or a '—' shape so as to prevent external shocks and damages from being caused to the upper ends and lateral portions of the normal power terminal and the emergency power terminal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

An auto transfer switch according to an embodiment of the invention includes terminal covers formed on an upper end of a normal power terminal and an upper end of an emergency power terminal.

Hereinafter, the present invention will be described in detail by explaining exemplary embodiments thereof with reference to the attached drawings.

Figure 1:
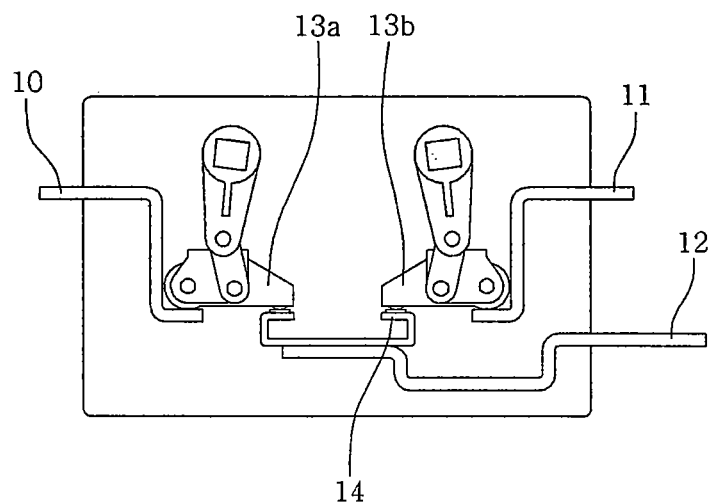
FIG. 1 is a cross-sectional view of a conventional auto transfer switch.
Figure 2:
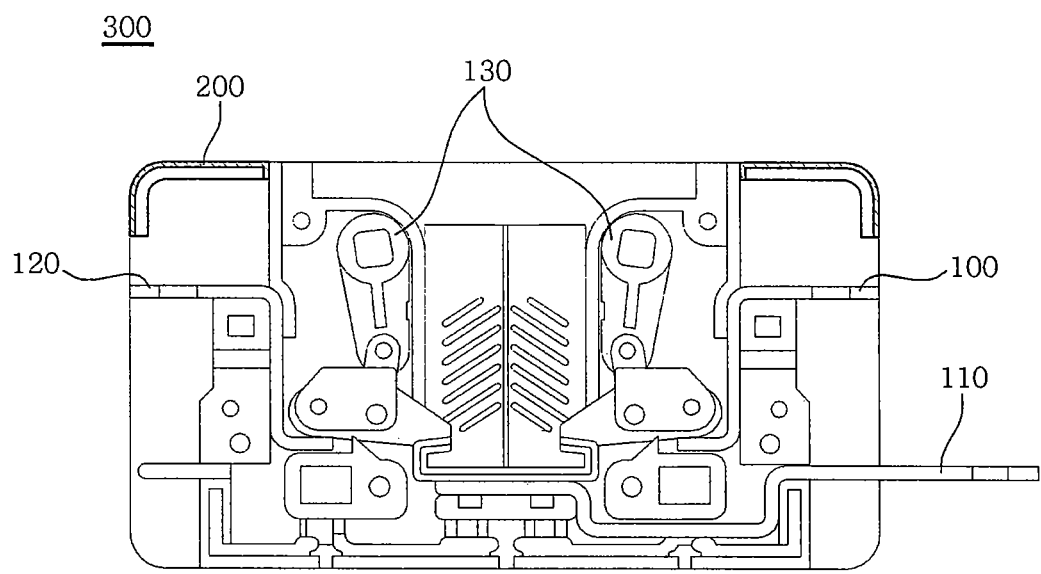
FIG. 2 is a side cross-sectional view of an auto transfer switch including terminal covers, according to an embodiment of the present invention.

FIG. 2 is a side cross-sectional view of an auto transfer switch 300 including terminal covers 200 according to an embodiment of the present invention The auto transfer switch 300 performs power-transfer between two power terminals of a normal power terminal 120 and an emergency power terminal 100 so that power may be supplied to a load-side terminal 110 from the emergency power terminal 100. Power may be transferred between the load-side terminal 110, and the normal power terminal 120 and the emergency power terminal 100 of both sides of the load-side terminal 110 by moving a pair of movable contactors 130. However, the normal power terminal 120 and the emergency power terminal 100 are exposed out of the auto transfer switch 300 without separate covers.

Likewise, conventionally, the normal power terminal 120 and the emergency power terminal 100 are exposed. However, according to the present embodiment, the terminal covers 200 are formed on an upper end of the normal power terminal 120 and an upper end of the emergency power terminal 100 so as to protect the normal power terminal 120 and the emergency power terminal 100.

The terminal covers 200 may be formed of any insulating material. In addition, the terminal covers 200 may be formed to have a 'ㄱ(r)' shape or a '—' shape so as to prevent external shocks and damages from being caused to the upper ends and lateral portions of the normal power terminal 120 and the emergency power terminal 100.

The terminal covers 200 may be coupled to a body of the auto transfer switch 300 by using a press fitting method. In addition, any methods may be used as long as the terminal covers 200 may be easily coupled to the auto transfer switch 300. These methods including the press fitting method are simple and can reduce an assembly period of time.

Figure 3:
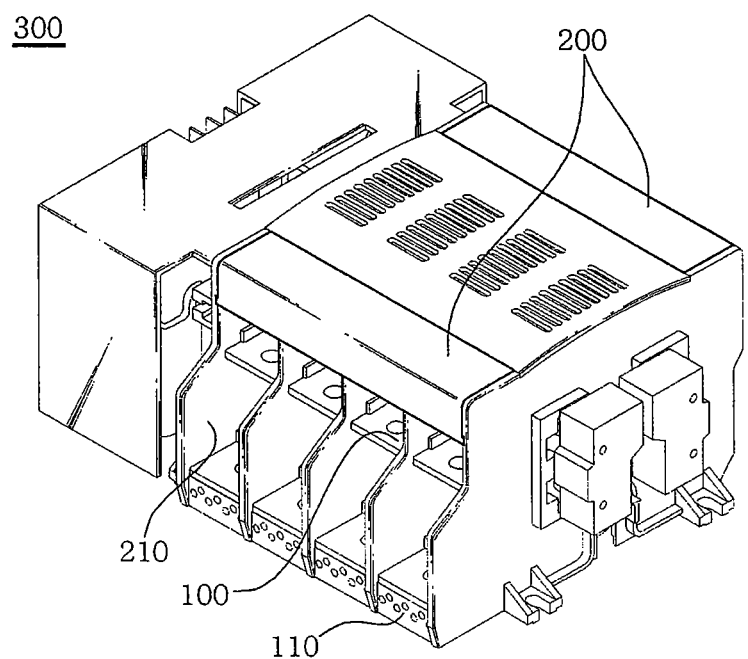
FIG. 3 is a perspective view of an auto transfer switch where terminal covers are coupled thereto, according to an embodiment of the present invention.

FIG. 3 is a perspective view of an auto transfer switch 300 where terminal covers 200 are coupled thereto, according to another embodiment of the present invention.

Referring to FIG. 3, it can be seen that the auto transfer switch 300 may be configured so that entire appearance of the auto transfer switch 300 may be stable by forming the terminal covers 200 on a normal power terminal 120 and an emergency power terminal 100.

As shown in FIG. 3, a cover 210 may be formed in a vertical direction with respect to the normal power terminal 120 and the emergency power terminal 100. When the terminal covers 200 are formed in addition to the cover 210, the possibility of protecting the normal power terminal 120 and the emergency power terminal 100 of the auto transfer switch 300 may be further increased.

As described above, the terminal covers 200 may improve appearance of the auto transfer switch 300 as well as protect the normal power terminal 120 and the emergency power terminal 100. Although the above-described technical feature is very simple, excellent technical effect may be achieved, and thus the technical merits of the embodiments of the present invention are clearly known.

According to the embodiments of the present invention, terminals may be protected by forming terminal covers on upper ends of the terminals of an auto transfer switch, thereby preventing of the terminals from being damaged.

In addition, since the terminal covers are formed on the upper ends of the terminals, the terminals covers may protect the terminals, thereby preventing operators from being hurt by electric shock.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An auto transfer switch with a terminal cover that supplies normal power to a normal power terminal and supplies emergency power to an emergency power terminal to supply current to a load-side terminal, wherein the terminal cover is coupled to an upper end of the normal power terminal and an upper end of the emergency power terminal so as to protect the normal power terminal and the emergency power terminal by using a press fitting method, and has a "ㄱ" shape.

* * * * *